(12) United States Patent
Sallam

(10) Patent No.: US 7,735,100 B1
(45) Date of Patent: Jun. 8, 2010

(54) REGULATING REMOTE REGISTRY ACCESS OVER A COMPUTER NETWORK

(75) Inventor: Ahmed Sallam, Los Angeles, CA (US)

(73) Assignee: Symantec Corporation, Cupertino, CA (US)

( * ) Notice: Subject to any disclaimer, the term of this patent is extended or adjusted under 35 U.S.C. 154(b) by 1812 days.

(21) Appl. No.: 10/830,639

(22) Filed: Apr. 22, 2004

(51) Int. Cl.
*G06F 9/44* (2006.01)
*G06F 9/00* (2006.01)

(52) U.S. Cl. .............................. 719/330; 716/2; 716/14

(58) Field of Classification Search .................. 709/217, 709/224, 225, 229; 726/2, 12, 17, 19, 22, 726/23, 4, 14, 24, 25; 713/165, 166, 167, 713/168, 169, 170; 719/310, 330
See application file for complete search history.

(56) References Cited

U.S. PATENT DOCUMENTS

| | | | |
|---|---|---|---|
| 4,776,537 A | 10/1988 | Garside et al. | |
| 4,888,798 A | 12/1989 | Earnest | |
| 5,050,212 A | 9/1991 | Dyson | |
| 5,103,476 A | 4/1992 | Waite et al. | |
| 5,182,770 A | 1/1993 | Medveczky et al. | |
| 5,432,851 A | 7/1995 | Scheidt et al. | |
| 5,450,576 A | 9/1995 | Kennedy | |
| 5,530,757 A | 6/1996 | Krawczyk | |
| 5,548,532 A | 8/1996 | Menand et al. | |
| 5,564,054 A | 10/1996 | Bramnick et al. | |
| 5,596,711 A | 1/1997 | Burckhartt et al. | |
| 5,606,609 A | 2/1997 | Houser et al. | |
| 5,625,693 A | 4/1997 | Rohatgi et al. | |
| 5,661,848 A | 8/1997 | Bonke et al. | |
| 5,708,776 A | 1/1998 | Kikinis | |
| 5,765,151 A | 6/1998 | Senator | |
| 5,781,633 A * | 7/1998 | Tribble et al. ................ 713/167 |
| 5,799,088 A | 8/1998 | Raike | |
| 5,802,080 A | 9/1998 | Westby | |
| 5,854,759 A | 12/1998 | Kaliski, Jr. et al. | |
| 5,922,072 A | 7/1999 | Hutchinson et al. | |

(Continued)

FOREIGN PATENT DOCUMENTS

EP 0858031 A1 8/1998

(Continued)

OTHER PUBLICATIONS

Richter, J., Microsoft.com web pages (online). "Design a Windows NT Service to Exploit Special Operating System Facilities", Oct. 1997.

(Continued)

*Primary Examiner*—Van H Nguyen
(74) *Attorney, Agent, or Firm*—Fenwick & West LLP

(57) ABSTRACT

Within the context of a system of networked computers, a remote registry access manager regulates remote registry access. In some embodiments, the remote registry access manager runs on a first computer and detects attempts by processes on the first computer to remotely access a second computer's registry. The remote registry access manager determines whether attempts to remotely access the second computer's registry are legitimate. Legitimacy of a given remote access attempt may be determined based on a number of different criteria, such as whether the first computer and the second computer have an established trust relationship. If a given attempt is indeed determined to be legitimate, the remote registry access manager allows the attempt to proceed. If it is not, then the remote registry access manager blocks the attempt.

19 Claims, 3 Drawing Sheets

U.S. PATENT DOCUMENTS

| | | | | |
|---|---|---|---|---|
| 5,925,126 | A * | 7/1999 | Hsieh | 726/19 |
| 5,956,475 | A | 9/1999 | Burckhartt et al. | |
| 5,974,546 | A | 10/1999 | Anderson | |
| 5,974,549 | A * | 10/1999 | Golan | 726/23 |
| 6,000,032 | A | 12/1999 | Millard | |
| 6,014,744 | A | 1/2000 | McKaughan et al. | |
| 6,014,767 | A | 1/2000 | Glaise | |
| 6,048,090 | A | 4/2000 | Zook | |
| 6,061,788 | A | 5/2000 | Reynaud et al. | |
| 6,079,016 | A | 6/2000 | Park | |
| 6,088,803 | A | 7/2000 | Tso et al. | |
| 6,161,139 | A * | 12/2000 | Win et al. | 709/225 |
| 6,453,353 | B1 * | 9/2002 | Win et al. | 709/229 |
| 6,480,962 | B1 * | 11/2002 | Touboul | 726/22 |
| 6,728,884 | B1 * | 4/2004 | Lim | 726/12 |
| 6,820,136 | B1 * | 11/2004 | Pham et al. | 709/248 |
| 7,401,229 | B2 * | 7/2008 | Ishidoshiro | 713/189 |
| 2003/0046586 | A1 * | 3/2003 | Bheemarasetti et al. | 713/201 |
| 2003/0159070 | A1 | 8/2003 | Mayer et al. | |
| 2003/0177385 | A1 * | 9/2003 | Price et al. | 713/201 |
| 2005/0240658 | A1 * | 10/2005 | Schulke | 709/217 |

FOREIGN PATENT DOCUMENTS

| | | |
|---|---|---|
| WO | WO 93/25024 A1 | 12/1993 |
| WO | WO 95/15522 A1 | 6/1995 |
| WO | WO 95/22794 A1 | 8/1995 |

OTHER PUBLICATIONS

Parkhouse, Jayne, "Pelican SafeTNet 2.0", [online] Jun. 2000, SC Magazine Product Review.

MacNamra, John E., "Technical Aspects of Data Communication", 2ed. 1982, Digital Equipment Corporation, U.S.A. pp. 110-122.

Ore, Oystein, "Number Theory and Its History", 1976 Gudron Ore, U.S.A. pp. 124-129.

Schneier, Bruce, "Applied Cryptography", 2ed. 1996, Bruce Schneier, U.S.A. pp. 436-441.

Nair, et al., "A Symbol Based Algorithm for Hardware Implementation of Cycle Redundancy Check", IEEE, 1997.

"PC Medic 97 User's Guide", McAfee Associates, Inc., issued Mar. 1997, pp. 1-66.

"Norton Utilities for Windows User's Guide—Version 2.0", Symantec, 1995.

* cited by examiner

120
REGULATING REMOTE REGISTRY ACCESS OVER A COMPUTER NETWORK

TECHNICAL FIELD

This invention pertains generally to computer security, and more specifically to regulating remote registry access.

BACKGROUND ART

Networked computers are vulnerable to malicious computer code attacks, such as worms, viruses and Trojan horses. As used herein, "malicious computer code" is any code that enters a computer without an authorized user's knowledge and/or without an authorized user's consent.

A majority of malicious code today is targeted at computers running the Microsoft Windows® operating system, because of its market prevalence. Therefore, it is important to identify and patch security vulnerabilities in Windows®. One important security vulnerability today is the remote registry access service provided in Windows NT® family of operating systems (Windows® 2000, XP, 2003, etc.).

These versions of Windows® provide a function called RegConnectRegistry, which allows a caller on a source computer to remotely access the registry of a target computer, thus providing open remote access to the registry database on any reachable computer within a network. In order to access a remote registry, the calling process on the source computer must be owned by a user with logon privileges on the target computer. However, where this is the case, knowledge of the IP address of the target computer is all that is needed for remote registry access.

Clearly, this provides an opportunity for malicious code that has managed to infect the source computer to access highly sensitive data in registries of remote computers that the malicious code has not managed to infect. A common ability of computer worms is to be able to generate mass numbers of IP addresses within seconds. If such a worm utilizes its IP address list and attempts to access each target computer's registry remotely, the worm might be able to access many remote registries very quickly.

Once malicious code has accessed a remote registry, it can inflict damage to the target computer at will. The malicious code could, for example, read certain fields in the registry to collect sensitive information about the hardware environment, the software environment, the users of this computer, etc. The malicious code could also collect information about the installed applications, and based on that information, target a customized malicious attack of the remote computer. The malicious code could even be polymorphic, and able to generate different malicious infections based on its own evaluation of the target computer.

The malicious code could also scan different well-known areas in the registry to harvest e-mail addresses to be used for mass mailing of itself from the machine it has maliciously accessed. The worm may read the registry database to enumerate the names of the current existing shares on the target victim machine. After that it can try to access those shares directly. The worm might have enough access rights to access the target share. Otherwise, it can start to apply a brute-force attack to every remote share it was able to identify. This will confuse a local malicious code blocking engine because the worm does not have to issue certain network API calls to enumerate share names within the network.

Malicious code could also modify the "run" entry on the target computer to point to itself, or to custom malicious code that it produced specifically to attack the target computer. Malicious code with remote registry access could even modify registry entries on the target computer to disallow anti-virus programs from running when the computer restarts. The malicious code could also destroy security attributes stored in the registry to violate the integrity of the security data, and modify the system policies stored in the registry to allow or block certain actions.

Because there are so many harmful things that malicious code can do after gaining remote access to the registry database of a remote computer, what is needed are methods, systems and computer readable media for regulating remote registry access. More specifically, remote registry access should be regulatable at both the source computer and the target computer.

DISCLOSURE OF INVENTION

The present invention comprises methods, systems and computer readable media for a remote registry access manager (101) to regulate remote registry (105) access. In some embodiments, the remote registry access manager (101) runs on a first computer (102) and detects attempts by processes on the first computer (102) to remotely access a second computer's (103) registry (105). The remote registry access manager (101) determines whether attempts to remotely access the second computer's (103) registry (105) are legitimate. In responsive to determining that an attempt is legitimate, the remote registry access manager (101) allows the attempt to proceed. In responsive to determining that an attempt is not legitimate, the remote registry access manager (101) blocks the attempt.

In some embodiments, the remote registry access manager (101) runs on a computer (102) and detects remotely initiated attempts to access the computer's (102) registry (103). The remote registry access manager (101) determines whether remotely initiated attempts to access the computer's (102) registry (105) are legitimate or not legitimate, and allows or blocks the requests as appropriate.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
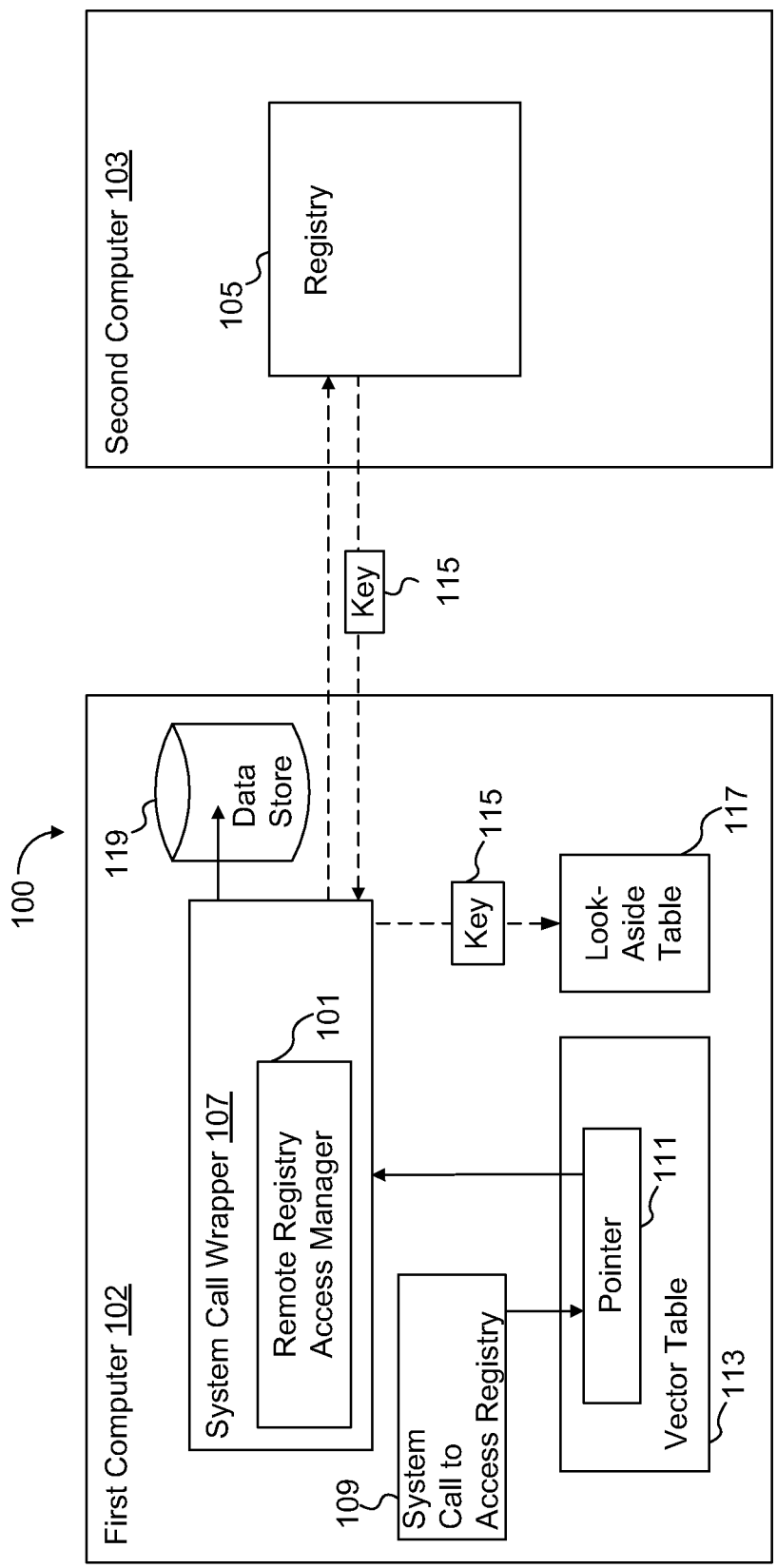
FIG. 1 is a block diagram illustrating a high level overview of a remote registry access manager running on a first computer blocking non-legitimate attempts to remotely access registries of other computers, according to some embodiments of the present invention.

FIG. 1 illustrates a high level overview of a system 100 for performing some embodiments of the present invention. A remote registry access manager 101 on a first computer 102 regulates attempts to remotely access a second computer's 103 registry 105. It is to be understood that although the remote registry access manager 101 is illustrated as a single entity, as the term is used herein a remote registry access manager 101 refers to a collection of functionalities which can be implemented as software, hardware, firmware or any combination of the three. Where a remote registry access manager 101 is implemented as software, it can be implemented as a standalone program, but can also be implemented in other ways, for example as part of a larger program, as a plurality of separate programs, or as one or more statically or dynamically linked libraries.

As illustrated in FIG. 1, in some embodiments the remote registry access manager 101 is instantiated in the form of at least one system call wrapper 107. The implementation mechanics of intercepting system calls 109 by overwriting pointers 111 in an interrupt vector table 113 and redirecting the pointers 111 to a system call wrapper 107 are known to those of ordinary skill in the relevant art.

In such embodiments, system calls 109 to access the registry 105 of a remote computer 103 are intercepted. For example, in current versions of Microsoft Windows NT®, the system call 109 that allows remote registry access is RegConnectRegistry( ) Of course, in various operating environments, the function that provides such access could have other names, or be instantiated in the form of multiple functions.

Because the relevant system call(s) 109 are intercepted, the remote registry access manager 101 can monitor and control attempts to remotely access the registries 105 of remote computers 103. In various embodiments, different criteria can be utilized to determine whether the access is to be allowed or blocked. In some embodiments, access will be allowed where a trust relationship has been established between the first (source) computer 102 and the second (target) computer 103. A more fine-grained security policy can be defined, either at a network or host level, for example to allow only certain computers, processes and/or users to remotely access the registry 103 database on certain other computers, to block certain computers 103, processes and/or users from having remote registry access to all or certain other computers (the black list concept) or to specifically allow certain computers, processes and/or users to have such access (the white list concept).

The security policy can further dictate certain dates and/or times at which specific types of remote access are to be allowed (or blocked). The security policy can further articulate specific numbers of times remote registry operations can be performed per day, per hour, by user, etc. The security policy can also control registry access at a registry key level, preventing specific (or all) types of access to certain sensitive registry keys, and/or allowing access to other keys as desired.

In some embodiments, if remote registry access is granted according to the security policy as described above, then the remote registry access manager 101 stores the registry key handle 115 returned by the intercepted system call 109 in a look-aside table 117 (or other suitable data structure). The remote registry access manager 101 then enforces the security policy against future local registry function calls 109 seeking to access the associated key through the stored handle 115. Because the key handle 115 will now appear local, the remote registry access manager 101 intercepts all registry access functions 109, and applies the security policy to any attempts to access remote keys through handles 115 stored in the look-aside table 117.

In some embodiments, the remote registry access manager 101 logs blocked remote registry access requests to an external data store 119. In some embodiments, a frequent number of blocked requests by a process (or multiple processes owned by a single user) will trigger the remote registry access manager 101 to adjudicate that the requesting process is malicious. In such embodiments, the remote registry access manager 101 can execute a malicious code processing engine (not shown) to block the operation of the malicious code, and remove it from the system. In other embodiments, the remote registry access manager 101 informs an appropriate system administrator or automatic malicious code manager, for example by e-mail or control signal.

In some embodiments, the remote registry access manager 101 logs allowed remote registry read and write operations to a data store 117, which can be used for security auditing. The remote registry access manager 101 can also monitor content read and/or written by allowed access operations in real time, and block operations that attempt to read or write suspected content (for example, attempts to write data having UNC path names to certain registry keys).

Figure 2:
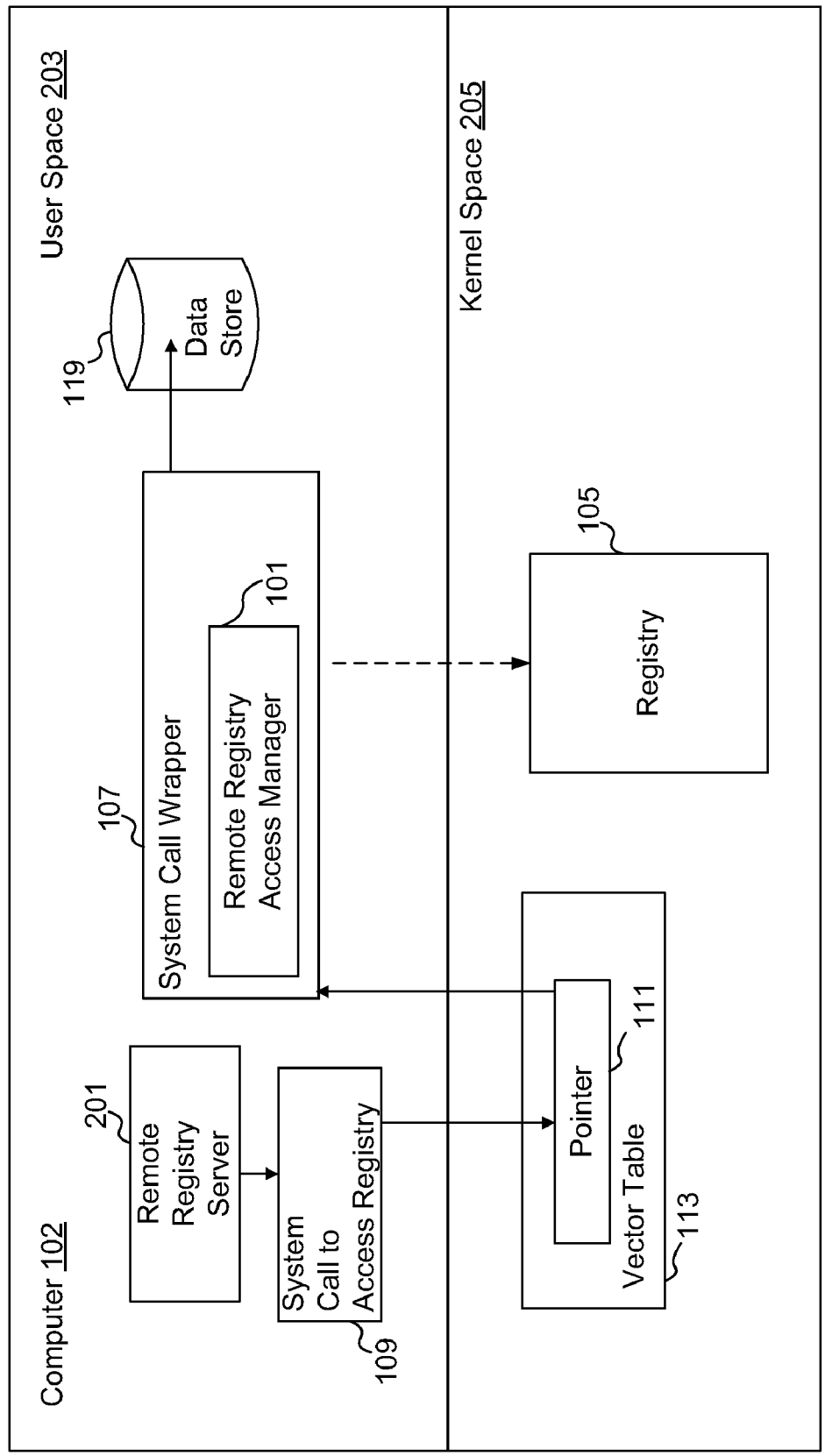
FIG. 2 is a block diagram illustrating a high level overview of a remote registry access manager running on a computer blocking remotely initiated non-legitimate attempts to access the computer's registry, according to some embodiments of the present invention.

In other embodiments, the remote registry access manager 101 running on a computer 102 blocks non-legitimate remotely initiated attempts to access the registry 105 of that computer 102. As illustrated in FIG. 2, in some such embodiments, the remote registry access manager 101 is instantiated as at least one system call wrapper 107, wrapping registry access system calls 109.

In various 32 bit versions of Windows®, all remote access to the registry 105 goes through a remote registry server 201. Therefore, registry access calls 109 made by the remote registry server 201 are of interest to the remote registry access manager 101. In Windows NT®, the remote registry server 201 runs in user space 203, and can be found under: \\hkey_local_machine\system\cuerrentcontrolset\servicers\ remoteregistry\parametersServiceDll=%systemroot%\ system32\regsvc.dll Of course, in other operating environments, the remote registry server 201 could reside in another dynamic link library, run in kernel space 205, or be implemented in another way. In any case, in any environment in which all remote access to the registry 105 goes through the remote registry server 201, the remote registry access manager 101 can intercept registry access calls 109 and identify those made by the remote registry server 201. By controlling the remote registry server's 201 access to the registry 105, the remote registry access manager 101 can enforce the desired security policy, as described above, in conjunction with FIG. 1. The remote registry access manager can also log blocked remote registry access attempts, use multiple blocked attempts to identify the process attempting the access as being malicious and inform a trusted process on the requesting computer (or elsewhere on the network) or a human user of the identification of the malicious code. The remote registry access manager 101 can also log allowed remoter registry access attempts, and monitor them for suspicious content as described above.

Figure 3:
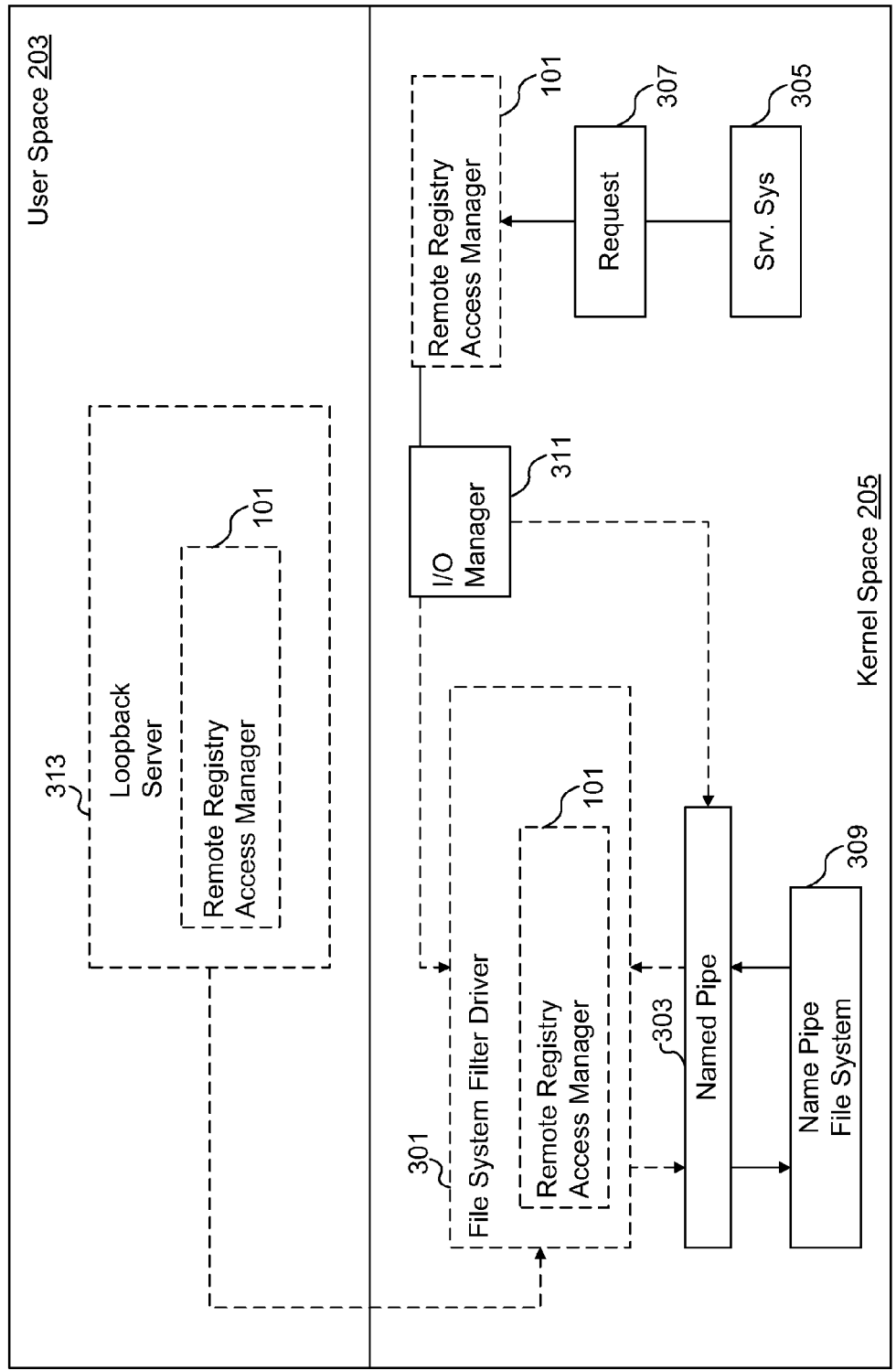
FIG. 3 is a block diagram illustrating a high level overview of a remote registry access manager running on a computer blocking remotely initiated non-legitimate attempts to access the computer's registry, according to other embodiments of the present invention.

Turning now to FIG. 3, in some embodiments the remote registry access manager 101 is instantiated within a file system filter driver 301. The implementation mechanics of file system filter drivers 301 are known to those of ordinary skill in the relevant art.

In Microsoft Windows® NT and related versions of Microsoft Windows®, the remote registry access protocol is implemented as a named pipe file 303 with the name \\.\pipe\winreg that is transferred through the CIFS (SMB) protocol. The protocol is implemented through the byte streams written into the \winreg named pipe 303. Inside the Windows kernel 205, srv.sys 305 issues file system IO requests 307 to the named pipes file system npfs.sys 309 with the file name equal to \winreg. Therefore, the remote registry access manager 101 can be installed in the form of a file system filter driver 301 that attaches to the named pipes file system 309 and filters the file I/O traffic that goes to \winreg. By filtering all such traffic, the remote registry access manager 101 can watch all attempts to remotely access the registry 105, and enforce the security policy as described above. The remote registry access manager 101 can also log and manage allowed and blocked requests as described above, in conjunction with FIG. 2.

The Winreg (remote registry access) protocol is known to those of ordinary skill in the relevant art, and is documented in different sources, such as the Samba project (www.samba.org) and the book *DCE/RPC over SMB: Samba and Windows NT Domain Internals*, Luke Leighton, Que, Dec. 10, 1999.

In another embodiment, the remote registry access manager 101 hooks the calls that srv.sys 305 makes the IO manager 311 to access the \\.\pipe\winreg file. This could be done by hooking the Portable Executable .IMPORTS table (not shown) of srv.sys 305 in memory, and filtering the file I/O request calls 307.

Alternatively, the remote registry access manager 101 can be implemented as a user mode 203 netbios loopback server 313. The implementation mechanics of loopback servers 313 are known to those of ordinary skill in the relevant art. Known examples include the Samba approach (www.samba.org) or the IBM AFS (www.afs.org) loopback server on Windows 2000®.

In loopkback server 313 based embodiments, the netbios loopback server 313 filters access requests to the \\.\pipe\winreg named pipe 303, and decodes the byte stream as defined by the remote registry access protocol. Thus, the remote registry access manager 101 can control remote registry access as described above.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for regulating remote registry access, the method comprising the steps of:
   a remote registry access manager on a first computer detecting an attempt by a process on the first computer to remotely access a second computer's registry via a remote registry access system call;
   the remote registry access manager determining whether the attempt to remotely access the second computer's registry is legitimate; and
   the remote registry access manager performing a step from a group of steps consisting of:
      responsive to determining that the attempt is legitimate:
         allowing the attempt to proceed,
         storing a registry key handle returned by the remote registry access system call,
         intercepting a local registry access system call,
         determining whether the local registry access system call is attempting to access a remote registry key through the stored handle,
         responsive to determining that the attempt to access the remote registry key through the stored handle is legitimate, allowing the attempt to access the remote registry key through the stored handle to proceed, and
         responsive to determining that the attempt to access the remote registry key through the stored handle is not legitimate, blocking the attempt to access the remote registry key through the stored handle; and
      responsive to determining that the attempt is not legitimate:
         blocking the attempt;
         logging the attempt;
         responsive at least in part to the process having made a plurality of blocked attempts, determining that the process comprises malicious code;
         responsive to determining that the process comprises malicious code, the remote registry access manager performing a step from a group of steps consisting of:
            executing a malicious code processing engine;
            informing an automatic malicious code manager of the malicious code; and
            informing a human user of the malicious code.

2. The method of claim 1 wherein:
   the remote registry access manager is instantiated as at least one system call wrapper.

3. The method of claim 1 further comprising the step of:
   the remote registry access manager determining that the attempt to remotely access the second computer's registry is legitimate responsive to a condition in a security policy from a group of conditions consisting of:
      the first computer and the second computer having an established trust relationship;
      the first computer being authorized to access the second computer's registry;
      the process on the first computer being authorized to access the second computer's registry;
      a user who owns the process on the first computer being authorized to access the second computer's registry;

the first computer being authorized to access registries of all remote computers;

the process on the first computer being authorized to access registries of all remote computers;

a user who owns the process on the first computer being authorized to access registries of all remote computers;

the first computer being authorized to access a target registry key in the registry of the second computer;

the process on the first computer being authorized to access a target registry key in the registry of the second computer;

a user who owns the process on the first computer being authorized to access a target registry key in the registry of the second computer;

the attempt to remotely access the second computer's registry being permitted at a current time; and the attempt to remotely access the second computer's registry being permitted on a current date.

4. The method of claim 1 further comprising the step of:

the remote registry access manager determining that the attempt to remotely access the second computer's registry is not legitimate responsive to a condition in a security policy from a group of conditions consisting of:

the first computer and the second computer not having an established trust relationship;

the first computer not being authorized to access the second computer's registry;

the process on the first computer not being authorized to access the second computer's registry;

a user who owns the process on the first computer not being authorized to access the second computer's registry;

the first computer not being authorized to access registries of any remote computers;

the process on the first computer not being authorized to access registries of any remote computers;

a user who owns the process on the first computer not being authorized to access registries of any remote computers;

the first computer not being authorized to access a target registry key in the registry of the second computer;

the process on the first computer not being authorized to access a target registry key in the registry of the second computer;

a user who owns the process on the first computer not being authorized to access a target registry key in the registry of the second computer;

the attempt to remotely access the second computer's registry not being permitted at a current time;

the attempt to remotely access the second computer's registry not being permitted on a current date; and the attempt to remotely access the second computer's registry being beyond a number of attempts permitted by an access quota.

5. The method of claim 1, further comprising logging the allowed access operation responsive to determining that the attempt is legitimate.

6. The method of claim 5 further comprising the steps of:

the remote registry access manager monitoring content operated on by the allowed operation; and responsive to determining that the content is suspect, the remote registry access manager blocking the allowed operation.

7. A computer implemented method for regulating remote registry access, the method comprising the steps of:

a remote registry access manager on a computer detecting a remotely initiated attempt by a process to access a target registry key of the computer's registry;

the remote registry access manager determining whether the remotely initiated attempt to access the computer's target registry key is legitimate by verifying that a computer from which the attempt originated is authorized to access the target registry key in the registry of the computer; and the remote registry access manager performing a step from a group of steps consisting of:

responsive to determining that the attempt is legitimate, allowing the remotely initiated access to the target registry key; and responsive to determining that the attempt is not legitimate:

blocking the remotely initiated access to the target registry key;

logging the blocked attempt;

responsive at least in part to the process having made a plurality of blocked attempts, determining that the process comprises malicious code;

responsive to determining that the process comprises malicious code, performing a step from a group of steps consisting of:

executing a remote malicious code processing engine;

informing a remote automatic malicious code manager of the malicious code; and informing a human user of the malicious code.

8. The method of claim 7 wherein:

the remote registry access manager is instantiated within a file system filter driver.

9. The method of claim 7 wherein:

the remote registry access manager is instantiated as at least one system call wrapper.

10. The method of claim 7 wherein:

the remote registry access manager is instantiated as a loopback server.

11. The method of claim 7 further comprising the step of:

the remote registry access manager determining that the attempt is not legitimate responsive to a condition in a security policy from a group of conditions consisting of:

a computer from which the attempt originated and the computer not having an established trust relationship;

the computer from which the attempt originated not being authorized to access the computer's registry;

the process on the computer from which the attempt originated not being authorized to access the computer's registry;

a user who owns the process on the computer from which the attempt originated not being authorized to access the computer's registry;

the computer from which the attempt originated not being authorized to access registries of any remote computers;

the process on the computer from which the attempt originated not being authorized to access registries of any remote computers;

a user who owns the process on the computer from which the attempt originated not being authorized to access registries of any remote computers;

the computer from which the attempt originated not being authorized to access a target registry key in the registry of the computer;

the process on the computer from which the attempt originated not being authorized to access a target registry key in the registry of the computer;

a user who owns the process on the computer from which the attempt originated not being authorized to access a target registry key in the registry of the computer;

the attempt to remotely access the computer's registry not being permitted at a current time;

the attempt to remotely access the computer's registry not being permitted on a current date; and the attempt to remotely access the computer's registry being beyond a number of attempts permitted by an access quota.

12. The method of claim 7 wherein the remote registry access manager allows the attempt to proceed, the method further comprising the step of:

the remote registry access manager logging the allowed access operation.

13. The method of claim 12 further comprising the steps of:

the remote registry access manager monitoring content operated on by the allowed operation; and responsive to determining that the content is suspect, the remote registry access manager blocking the allowed operation.

14. A computer readable storage medium containing a computer program product for regulating remote registry access, the computer program product comprising:

program code for detecting an attempt by a first computer to remotely access a second computer's registry via a remote registry access system call;

program code for determining whether the attempt to remotely access the second computer's registry is legitimate; and program code for performing a step from a group of steps consisting of:

responsive to determining that the attempt is legitimate:
  allowing the remote access to the registry,
  storing a registry key handle returned by the remote registry access system call,
  intercepting a local registry access system call,
  determining whether the local registry access system call is attempting to access a remote registry key through the stored handle,
  responsive to determining that the attempt to access the remote registry key through the stored handle is legitimate, allowing the attempt to access the remote registry key through the stored handle to proceed, and
  responsive to determining that the attempt to access the remote registry key through the stored handle is not legitimate, blocking the attempt to access the remote registry key through the stored handle; and responsive to determining that the attempt is not legitimate:
  blocking the remote access to the registry;
  logging the attempt;
  responsive at least in part to the process having made a plurality of blocked attempts, determining that the process comprises malicious code;
  responsive to determining that the process comprises malicious code, performing a step from a group of steps consisting of:
    executing a malicious code processing engine;
    informing an automatic malicious code manager of the malicious code; and
    informing a human user of the malicious code.

15. The computer readable storage medium of claim 14 wherein:

the actions of the program code are performed by a remote registry access manager that is instantiated as at least one system call wrapper.

16. The computer readable storage medium of claim 14 further comprising program code for performing the step of:

determining that the attempt to remotely access the second computer's registry is legitimate responsive to a condition in a security policy from a group of conditions consisting of:

the first computer and the second computer having an established trust relationship;

the first computer being authorized to access the second computer's registry;

the process on the first computer being authorized to access the second computer's registry;

a user who owns the process on the first computer being authorized to access the second computer's registry;

the first computer being authorized to access registries of all remote computers;

the process on the first computer being authorized to access registries of all remote computers;

a user who owns the process on the first computer being authorized to access registries of all remote computers;

the first computer being authorized to access a target registry key in the registry of the second computer;

the process on the first computer being authorized to access a target registry key in the registry of the second computer;

a user who owns the process on the first computer being authorized to access a target registry key in the registry of the second computer;

the attempt to remotely access the second computer's registry being permitted at a current time; and the attempt to remotely access the second computer's registry being permitted on a current date.

17. The computer readable storage medium of claim 14 further comprising program code for performing the step of:

determining that the attempt to remotely access the second computer's registry is not legitimate responsive to a condition in a security policy from a group of conditions consisting of:

the first computer and the second computer not having an established trust relationship;

the first computer not being authorized to access the second computer's registry;

the process on the first computer not being authorized to access the second computer's registry;

a user who owns the process on the first computer not being authorized to access the second computer's registry;

the first computer not being authorized to access registries of any remote computers;

the process on the first computer not being authorized to access registries of any remote computers;

a user who owns the process on the first computer not being authorized to access registries of any remote computers;

the first computer not being authorized to access a target registry key in the registry of the second computer;

the process on the first computer not being authorized to access a target registry key in the registry of the second computer;

a user who owns the process on the first computer not being authorized to access a target registry key in the registry of the second computer;

the attempt to remotely access the second computer's registry not being permitted at a current time;

the attempt to remotely access the second computer's registry not being permitted on a current date; and the attempt to remotely access the second computer's registry being beyond a number of attempts permitted by an access quota.

18. The computer readable storage medium of claim 14 further comprising program code for logging the allowed access operation responsive to determining that the attempt is legitimate.

19. The computer readable storage medium of claim 18 further comprising program code for performing the steps of:

monitoring content operated on by the allowed operation; and responsive to determining that the content is suspect, blocking the allowed operation.

* * * * *